Figure 1:
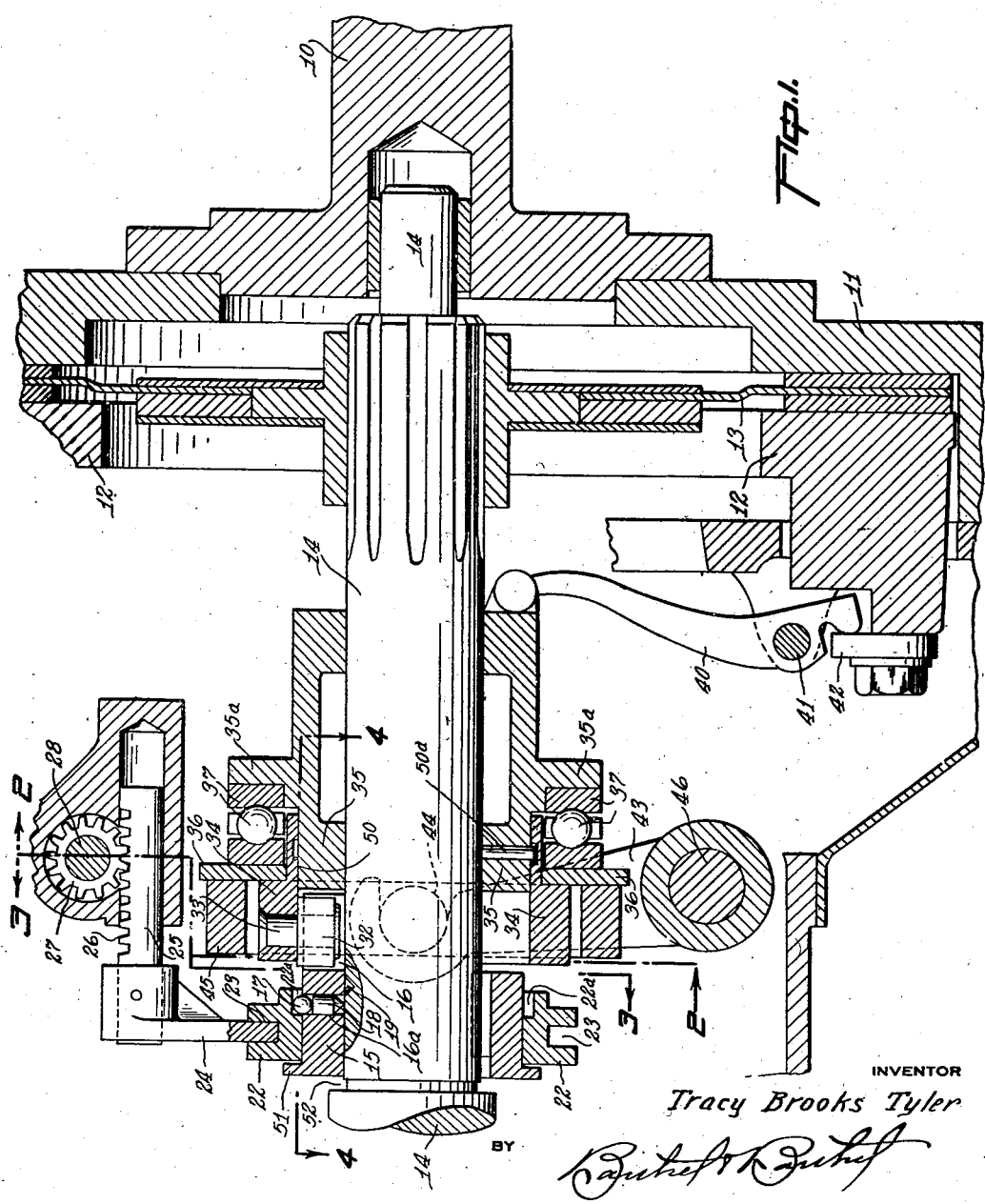

Nov. 24, 1936.    T. B. TYLER    2,061,990
CLUTCH CONTROL MEANS
Original Filed May 31, 1932    3 Sheets-Sheet 1

INVENTOR
Tracy Brooks Tyler
BY
ATTORNEYS

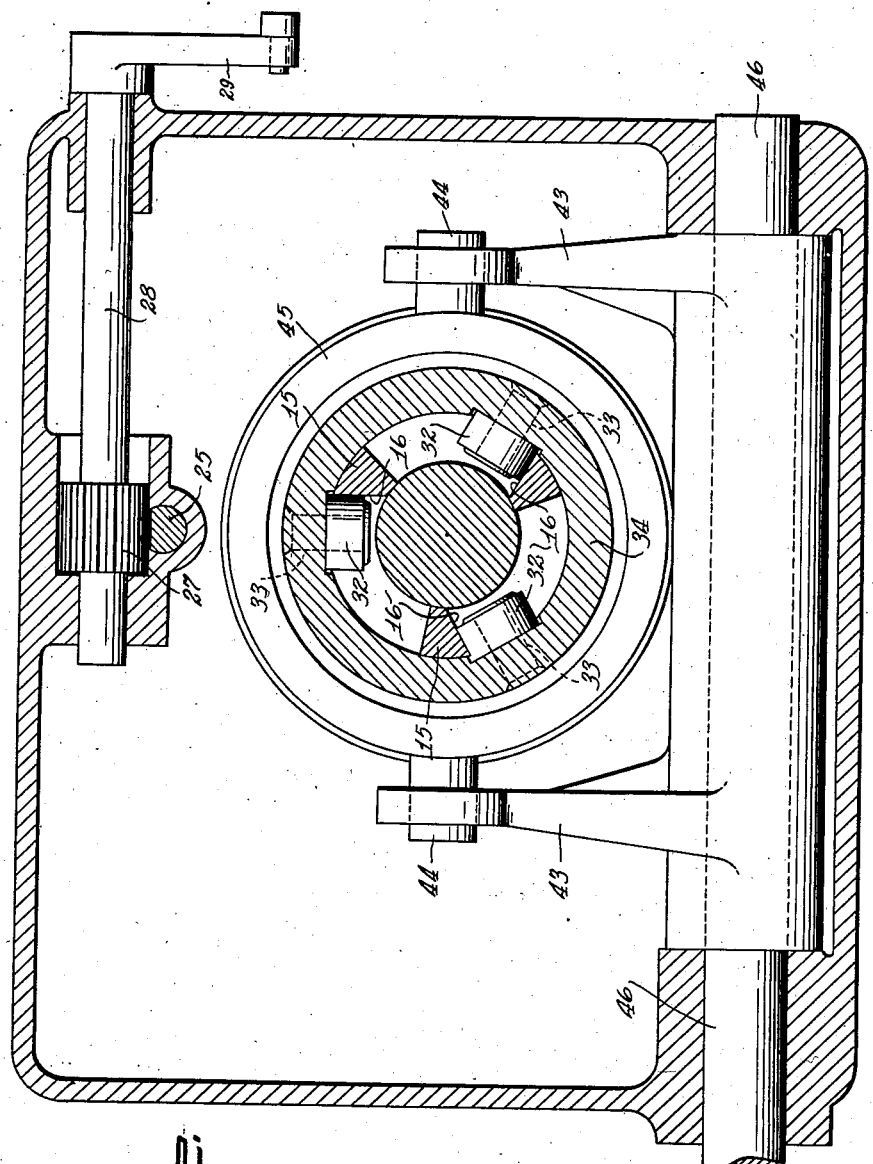

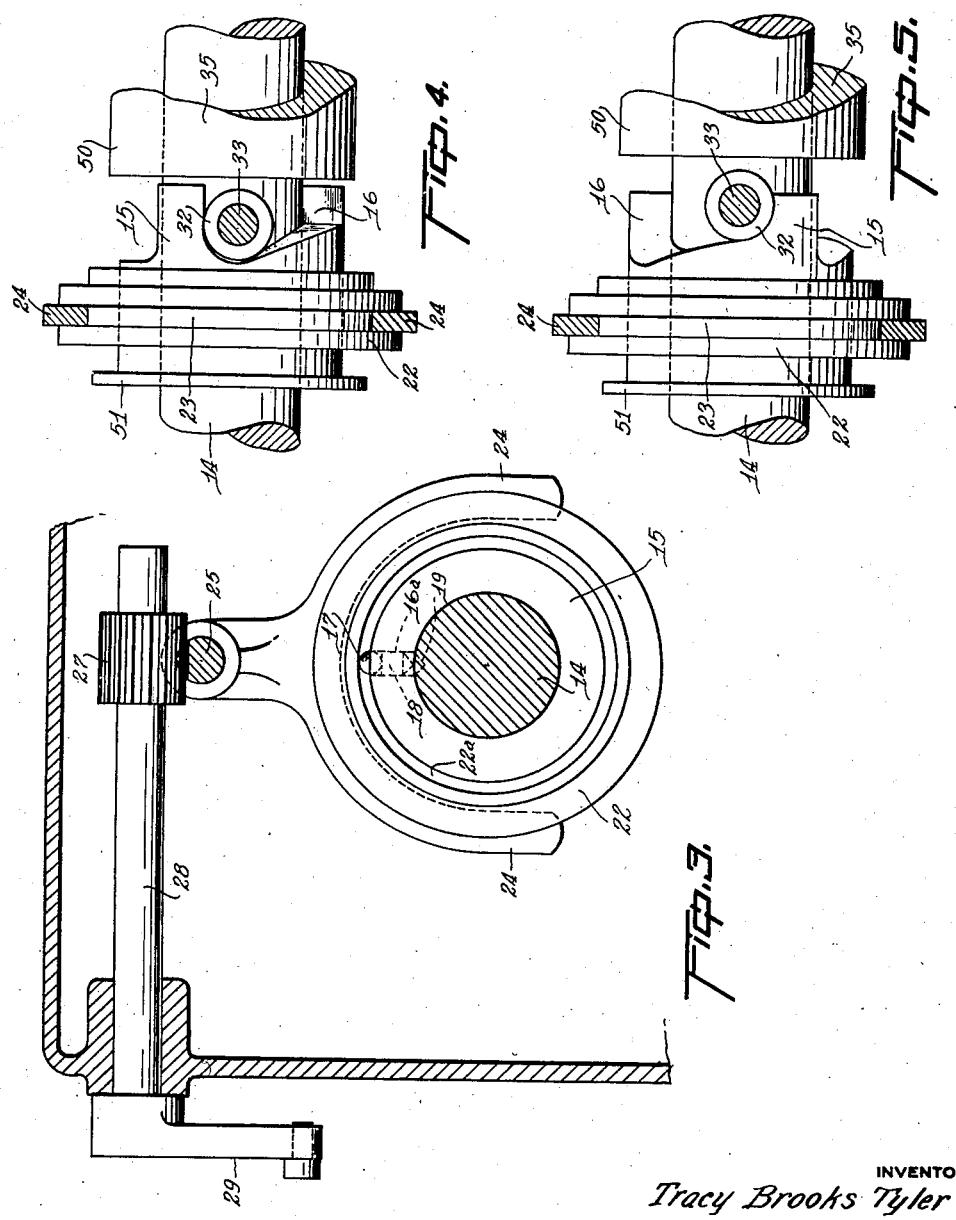

Patented Nov. 24, 1936

2,061,990

UNITED STATES PATENT OFFICE 2,061,990

CLUTCH CONTROL MEANS

Tracy Brooks Tyler, Detroit, Mich., assignor to The Monopower Corporation, Detroit, Mich., a corporation of Michigan Application May 31, 1932, Serial No. 614,350
Renewed January 23, 1936

13 Claims. (Cl. 192—114)

This invention relates to clutches and more particularly to means for postponing clutch engagement until the speed of one of the shafts or parts to be relatively clutched equals or surpasses the speed of the other one of the parts.

In the operation of automobiles the operator sometimes causes the vehicle to coast with the master clutch disengaged, the engine running, and the transmission parts in gear. After a few moments of coasting, he sometimes permits the clutch to become engaged, and since the engine, which may have been idling and has consequently lost speed, is moving much more slowly than is the transmission shaft, there is a noticeable lurch of the vehicle when clutch engagement between the engine shaft and the transmission shaft is reestablished. It therefore appears desirable to provide means for preventing reengagement of the clutch, especially an automobile master clutch, until the speed of the engine shaft equals or surpasses that of the transmission shaft, and the principal object of the invention therefore is a means such as is described above to be desirable.

Still further objects of the invention will become readily apparent from the appended drawings showing an embodiment of the same and from the detailed description which follows.

Referring to the drawings, it will be seen that Figure 1 is a longitudinal transverse sectional view of one embodiment of the invention, the parts being shown as maintained inoperative;

Figs. 2, 3, and 4 are sections as if on the lines 2—2, 3—3, and 4—4 of Fig. 1 and as if looking in the direction of arrows 2—2, 3—3, and 4—4 thereof; and Fig. 5 is a view similar to that of Fig. 4 but showing the parts thereof in another position.

Referring to Figure 1 of the drawings, it will be seen that there is shown a shaft 10, normally a driving shaft, and normally connected to the engine crank shaft. To the clutch driving shaft is fixed a non-reciprocable clutch plate 11, which may be frictionally engaged for driving, by a clutch pressure plate 12, slidably mounted relatively to the plate 11 and cooperating with a friction disc 13, splined on a transmission shaft 14, as shown. The device of the invention, when placed in operation by the operator, permits plate 12 to be moved towards plate 11, to create a driving relation between the shafts 10 and 14, through disc 13, only when the speed of the shaft 10 is equal to or greater than that of the shaft 14.

Keyed to and slidable on the shaft 14 is a collar 15 having peripherally spaced notches 16 in its edge, as shown in Figs. 1, 2, 4, and 5, and also having radial bores 16a containing balls 17 and conical plungers 18 adapted to be seated in the conical depressions 19 of the shaft 14, to prevent relative movement between the collar and the shaft.

Loosely surrounding and supported on the collar 15 is a ring 22 having a relief groove 22a, retaining the balls 17, and an external groove 23 in which is disposed the yoked end of a fork 24, fixed to a rod 25, the latter having rack teeth 26 meshing with the teeth of a pinion 27 fixed to a cross shaft 28 provided with a crank 29, actuable by a Bowden-wire or the like accessible to the operator of the vehicle, and controlling the position and fixation of collar 15 on shaft 14.

Disposed in the notches 16, which are shaped as shown in Figs. 4 and 5 are rollers 32 on studs 33, these being fixed to and projecting inwardly from a collar 34, journalled on a sleeve 35. The collar 34 is longitudinally spaced from a flange 35a of the sleeve 35 by an annular washer 36 and a thrust bearing 37 abutting the flange 35a. The sleeve 35 is journalled on shaft 14 and its end engages the round ends of peripherally spaced, radially extending rocker arms 40, pivotally mounted at 41, and hooked behind portions 42 of the slidable clutch pressure plate 12. It will be seen that reciprocation of sleeve 35 on shaft 14, as actuated by a clutch fork 43 yoked to outwardly projecting pins 44 of a collar 45 loosely surrounding collar 34, retracts clutch plate 12 from clutch plate 11, against the influence of springs, not shown, or permits it to be advanced by said springs towards clutch plate 11. The fork 43 is journalled on a shaft 46, and is moved by the operator, or automatically, as desired.

The operation of the device is as follows: When the Bowden-wire or other device is moved by the operator so that pinion 27 is rotated counterclockwise, rod 25 will move to the right from the position of Fig. 1. Ring 22 will be moved to the right, moving collar 15 with it, the edge of relief 22a engaging the balls 17 and thus moving the collar 15 along until the collar plungers 18 reach the notches 19, whereupon they will move inwardly thereinto and the ring 22, passing over balls 17, will hold the collar 15 locked to the shaft 14.

Now, when the clutch fork 43 is moved to the right for clutch disengagement, by the operator or automatically, sleeve 35 will move to the right. Due to the pin and annular groove connection at 50a between sleeve 35 and rotating collar 34, the latter will also move to the right, until the rollers 32 move partially out of slots 16, that is to say, to the axial position of Figure 5. The sleeve 35 will revolve at a speed becoming increasingly less than the speed it had, namely the speed of shaft 14. The collars 15 and 34, however, will continue to revolve together, and at the speed of shaft 14. Both collars and the sleeve 35 will revolve in the same direction. Due to the friction on the annular surfaces 50 where collar 34 is journalled on sleeve 35, the rollers 32 will be caused to assume the position shown in Figure 5, where they will be in alignment with the shallow portions of slots or recesses 16.

When the clutch fork is moved to the left to permit clutch engagement, the clutch springs tend to move clutch plate 12 to the right; but these springs, reacting through the rocker arms 40, and sleeve 35, and tending to move collar 34 to the left, cannot function for clutch engagement unless rollers 32 are in line with the deep parts of slots 16; that is to say, the clutch cannot be reengaged if rollers 32 are in line with the shallow parts of slots 16.

If the speed of the shaft 14 and the collar 15 fixed thereto, namely the transmission speed, is greater than the speed of the sleeve 35, as will be the case when the vehicle is permitted to coast with the clutch disengaged, and the engine idling, the shallow parts of slots 16 will advance circumferentially and will align with the rollers 32, and accordingly the clutch will be prevented by the bottoms of the slots from becoming engaged. Not until the engine speed and consequently the speed of sleeve 35 becomes at least equal to or slightly greater than the speed of shaft 14 will the rollers become advanced circumferentially to the deep parts of slots 16 as shown in Fig. 4, to permit clutch engagement movement of the parts 35, etc.

In this fashion, clutch engagement is prevented from occurring when the shaft 14 is rotating at a speed greater than engine speed in the same direction. Accordingly, lurching of the vehicle, that ordinarily occurs on unsynchronized clutch reengagement after the vehicle has been coasting for a few moments, is eliminated.

If it is desired to render the automatic means inoperable, the operator may move the Bowden-wire or other device to cause fork 24 to move ring 22 to the left, that is to say, to the position of Fig. 1, against flange 51 of collar 15, which releases collar 15 from shaft 14 and then moves it to the left to take up space 52, until the shallow parts of slots 16 are so far back that, even when rollers 32 become aligned therewith, clutch engagement is possible. Return movement of fork 24, caused by the operator, moves collar 15 to the right and fixes it to the shaft 14 as previously described.

It will be observed that the device of the invention does not cause clutch disengagement, but operates merely to prevent clutch reengagement under certain conditions.

Further, the surfaces forming the bottoms of slots 16 are so inclined or angled, with respect to the axis of shaft 14, that the roller-carrying collar 34 moves to the left smoothly. Accordingly, clutch reengagement is effected smoothly, under the control of these angled surfaces.

It will further be observed that the device of the invention, while useful in connection with clutches whose engagement movement is under personal control, is particularly useful with clutches whose engagement movement is under the control of an automatic or power actuator for clutches, such as is disclosed in my copending application, Serial No. 614,946, filed June 2, 1932, where the engine speed, relative to clutch engagement speed, is not under personal control.

It will further be observed that while the bottom of each slot 16, at the shallow portion might well be uninclined, it is desirable to provide these points with a slight inclination, near the deeper portion, so that the rollers will start to move towards the deeper portions as soon as the speed of shaft 10 becomes equal to that of shaft 14, without there being the necessity of these rollers waiting until the speed of shaft 10 exceeds that of shaft 14.

It will be observed that the construction disclosed in this case is but one means for controlling clutch engagement, and that another means for accomplishing the same result is shown in my copending application, Serial No. 612,195 filed May 19, 1932, to which this application may be regarded as subordinate.

Now having described one embodiment of the invention, it is to be understood that the scope of the invention is not to be limited to that embodiment, but is to be limited only by the claims which follow.

What I claim is:

1. In combination with parts to be relatively connected and a clutch for connecting them, means for holding said clutch disengaged when the speed of a predetermined one of the parts exceeds that of the other, said means comprising a control member slidably and rotatably mounted on the predetermined part and connected to the other part to rotate therewith, said member being also connected to the shiftable element of said clutch to move in unison therewith, a retarding member secured to said predetermined part and adapted to prevent the control member and the shiftable element of said clutch from moving to clutch-engagement position when the speed of said predetermined part exceeds that of said other part, and means for rendering said retarding member inoperative to prevent clutch engagement movement of the control member, when the speed of said other part exceeds that of the predetermined part.

2. In combination with parts to be relatively connected and a clutch for connecting them, means for holding said clutch disengaged when the speed of a predetermined one of the parts exceeds that of the other, said means comprising a control member slidably and rotatably mounted on the predetermined part and connected to the other part to rotate at the speed of the latter, said member being also connected to the shiftable element of said clutch to move in unison therewith, a retarding member secured to said predetermined part and adapted to prevent the control member and the shiftable element of said clutch from moving to clutch-engagement position when the speed of said predetermined part exceeds that of said other part, and means for rendering said retarding member inoperative to prevent clutch engagement movement of the control member when the speed of said other part exceeds that of the predetermined part.

3. In combination with parts to be relatively connected and a clutch for connecting them, means for holding said clutch disengaged when the speed of a predetermined one of the parts exceeds that of the other, said means comprising a control member slidably and rotatably mounted on the predetermined part and connected to said other part to rotate therewith, means connecting said member to the shiftable element of said clutch whereby it moves in unison therewith, a retarding member keyed to said predetermined part, and an abutment projecting from one of said members towards the other member and engageable with the other member to positively hold the control member and said shiftable clutch element in clutch-disengagement position when the speed of the predetermined part exceeds that of the other part.

4. In combination with parts to be relatively connected and a clutch for connecting them, means for holding said clutch disengaged when the speed of a predetermined one of the parts exceeds that of the other, said means comprising a control member slidably and rotatably mounted on the predetermined part and connected to said other part to rotate therewith, means connecting said member to the shiftable element of said clutch whereby it moves in unison therewith, a retarding member keyed to said predetermined part, and an abutment projecting from one of said members towards the other member and engageable with the other member to positively hold the control member and said shiftable clutch element in clutch-disengagement position when the speed of the predetermined part exceeds that of the other part, and means responsive to the speed of the other part for moving said abutment from its member holding position when the speed of said other part equals or surpasses that of said predetermined part.

5. In combination with parts to be relatively connected and a clutch for connecting them, means for holding said clutch disengaged when the speed of a predetermined one of the parts exceeds that of the other, said means comprising a control member slidably and rotatably mounted on the predetermined part and connected to said other part to rotate therewith, means connecting said member to the shiftable element of said clutch whereby it moves in unison therewith, a retarding member keyed to said predetermined part, and an abutment projecting from the retarding one of said members towards the other member and engageable with the other member to positively hold the control member and said shiftable clutch element in clutch-disengagement position when the speed of the predetermined part exceeds that of the other part, and means responsive to the speed of the other part for moving said abutment from its member holding position when the speed of said other part equals or surpasses that of said predetermined part.

6. In combination with parts to be relatively connected and a clutch for connecting them, a control member slidably and rotatably mounted on a predetermined one of the parts and connected to said clutch, means for moving said control member into clutch engagement and clutch disengagement positions, means secured to said predetermined part adapted to enter the path of movement of said control member when the latter is in clutch disengagement position, and speed responsive means rendered active when said control member is in clutch disengagement position and when the speed of the predetermined part exceeds that of the other, said speed responsive means being adapted to move said means into the path of movement of said control member.

7. In combination with parts to be relatively connected and a clutch for connecting them, a control member slidably and rotatably mounted on a predetermined one of the parts and connected to said clutch, means for moving said control member into clutch engagement and clutch disengagement positions, means secured to said predetermined part and adapted to move into the path of said control member when the speed of the predetermined part exceeds the speed of the other part and when said control member is in clutch disengagement position, and manually controlled means for moving said second named means so that it cannot enter the path of movement of said control member.

8. In combination with parts to be relatively connected and a clutch for connecting them, a control member slidably and rotatably mounted on a predetermined one of the parts and connected to said clutch, means for moving said control member into clutch engagement and clutch disengagement positions, means secured to said predetermined part adapted to enter the path of movement of said control member when the latter is in clutch disengagement position, speed responsive means rendered active when said control member is in clutch disengagement position and when the speed of the predetermined part exceeds that of the other, said speed responsive means being adapted to move said means into the path of said control member, and manually controlled means for moving said second named means so that it cannot enter the path of movement of said control member.

9. In combination with parts to be relatively connected and a clutch for connecting them, a sleeve journalled on one of said parts and connected to said clutch and to the other of said parts, means for moving said sleeve into clutch engagement and disengagement positions, a collar keyed on the sleeve supporting part, and means rendered active by a differential in speed between said sleeve and collar when said sleeve is in clutch disengagement position for causing said collar to enter the path of movement of said sleeve to prevent movement thereof into clutch engagement position.

10. In combination with parts to be relatively connected and a clutch for connecting them, a sleeve journalled on one of said parts and connected to said clutch and to the other of said parts, means for moving said sleeve into clutch engagement and disengagement positions, a collar keyed on the sleeve supporting part, and abutments on said collar and sleeve moved into alignment by a differential in speed between said collar and sleeve when the latter is in clutch disengagement position to prevent movement of said sleeve to clutch engagement position.

11. In combination with parts to be relatively connected and a clutch for connecting them, a sleeve journalled on a predetermined one of said parts and connected to the other to rotate therewith, said sleeve being operatively connected to said clutch, means for moving said sleeve into clutch engagement and disengagement positions, a collar keyed on said predetermined part, said sleeve and collar having inter-engaging grooves and rollers rendered active when said sleeve is in clutch disengagement position and operated by a differential in speed between said sleeve and collar to prevent movement of said sleeve into clutch engagement position while said differential exists.

12. In combination with parts to be relatively connected and a clutch for connecting them, a sleeve journalled on a predetermined one of said parts and connected to the other to rotate therewith, said sleeve being operatively connected to said clutch, means for moving said sleeve into clutch engagement and disengagement positions, a collar keyed on said predetermined part, said sleeve and collar having inter-engaging grooves and rollers rendered active when said sleeve is in clutch disengagement position and operated by a differential in speed between said sleeve and collar to prevent movement of said sleeve into clutch engagement position while said differential exists, and manually controlled means for moving said collar to an inactive position.

13. In combination with parts to be relatively connected and a clutch for connecting them, a sleeve journalled on a predetermined one of said parts and connected to the other to rotate therewith, said sleeve being operatively connected to said clutch, means for moving said sleeve into clutch engagement and disengagement positions, a collar keyed on said predetermined part, means for moving said collar longitudinally, releasable means for locking said collar in a definite position on said shaft, said sleeve and collar having inter-engaging grooves and rollers rendered active when said sleeve is in clutch disengagement position and operated by a differential in speed between said sleeve and collar to prevent movement of said sleeve into clutch engagement position while said differential exists.

TRACY BROOKS TYLER.